United States Patent
McGowan et al.

(10) Patent No.: US 8,792,572 B1
(45) Date of Patent: Jul. 29, 2014

(54) UNIVERSAL PEAK POWER REDUCTION IN COMMUNICATION RADIOS

(71) Applicant: Telefonaktiebolaget L M Ericsson (Publ), Stockholm (SE)

(72) Inventors: Neil McGowan, Stittsville (CA); Marthinus Willem DaSilveira, Nepean (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/905,836

(22) Filed: May 30, 2013

(51) Int. Cl.
*H04K 1/02* (2006.01)
*H04L 27/26* (2006.01)

(52) U.S. Cl.
CPC .................................. *H04L 27/2623* (2013.01)
USPC .......................................... 375/260; 375/296

(58) Field of Classification Search
USPC .................................. 375/260, 296, 297, 350
See application file for complete search history.

(56) References Cited

U.S. PATENT DOCUMENTS

| | | | |
|---|---|---|---|
| 6,236,864 B1 | 5/2001 | McGowan et al. | |
| 6,687,511 B2 | 2/2004 | McGowan et al. | |
| 6,931,053 B2 | 8/2005 | McGowan | |
| 7,409,007 B1 * | 8/2008 | Johnson et al. | 375/296 |
| 7,542,517 B2 | 6/2009 | Kroeger | |
| 7,583,583 B2 | 9/2009 | Guo et al. | |
| 8,068,558 B2 | 11/2011 | Morris et al. | |
| 2006/0067426 A1 * | 3/2006 | Maltsev et al. | 375/297 |
| 2007/0188218 A1 * | 8/2007 | Ueda | 327/551 |
| 2009/0092195 A1 | 4/2009 | Guo et al. | |
| 2009/0176466 A1 | 7/2009 | Hellberg et al. | |
| 2010/0150256 A1 | 6/2010 | Morris et al. | |
| 2010/0303171 A1 | 12/2010 | Tong et al. | |
| 2011/0110457 A1 | 5/2011 | Lakkis | |
| 2012/0320948 A1 | 12/2012 | McGowan et al. | |

FOREIGN PATENT DOCUMENTS

| | | |
|---|---|---|
| EP | 1 990 964 A1 | 11/2008 |
| EP | 2 109 227 A1 | 10/2009 |
| EP | 2 206 307 B1 | 1/2013 |
| WO | 2005096579 A1 | 10/2005 |
| WO | 2008008012 A1 | 1/2008 |

* cited by examiner

*Primary Examiner* — Don N Vo
(74) *Attorney, Agent, or Firm* — Christopher & Weisberg, P.A.

(57) ABSTRACT

A method and system for achieving peak power reduction in the radio are disclosed. According to one aspect, universal peak power reduction is used to perform peak power reduction on time domain signals, such as CDMA, WCDMA and GSM, as well as frequency domain signals, such as OFDM signals used in long-term evolution, LTE, systems, and on combinations of time and frequency domain signals. Processing is performed on a segment of data at a time. The size of the segment of data chosen is based on a desired latency, frequency resolution and peak power reduction performance in a given system.

24 Claims, 5 Drawing Sheets

UNIVERSAL PEAK POWER REDUCTION IN COMMUNICATION RADIOS

TECHNICAL FIELD

The present invention relates to peak power reduction in a radio for wireless communications.

BACKGROUND

Digital reduction of the Peak to Average Power Ratio (PAPR) of a complex radio signal, while filtering the signal to remove out of band emissions, provides a way to reduce the peak demand on a power amplifier. This enables improved efficiency and cost of a radio system with a small but acceptable degradation in signal quality or Error Vector Magnitude (EVM).

Orthogonal frequency division multiplexing (OFDM) technologies have complex radio signals with many closely spaced sub-carriers each of which can have a very different EVM requirement. However the close frequency spacing makes it more difficult to provide differentiation from an EVM perspective while reducing the PAPR. Existing technologies do not efficiently differentiate between sub-carriers and also require reserved sub-carriers. In addition, time domain technologies such as global system for mobile communications (GSM), wideband code division multiple access (WCDMA) and code division multiple access (CDMA) need to be handled together with OFDM technologies in the same power amplifiers.

With the use of OFDM technologies, the signal is composed of an array of sub-carriers of varying tolerance to degradation in signal quality. Existing time domain solutions are unable to make a distinction between the sub-carriers, and so are limited in the amount of peak power reduction (PPR) that can be applied by the least tolerant sub-carrier. Some existing solutions do not differentiate between traffic sub-carriers and require reserved tones or reserved sub-carriers that take away from the allocated spectrum for normal communication e.g., APPARATUSES AND A METHOD FOR REDUCING PEAK POWER IN A TRANSMITTER OF TELECOMMUNICATIONS SYSTEMS, U.S. Patent Application Publication No. 2009/0176466 A1, Jul. 9, 2009; and SYSTEM AND METHOD FOR REDUCING PEAK TO AVERAGE POWER RATIO IN ORTHOGONAL FREQUENCY DIVISION MULTIPLEXING SIGNALS USING RESERVED SPECTRUM, U.S. Pat. No. 7,583,583, Filed Dec. 15, 2005. Other existing solutions differentiate between traffic sub-carriers but still require reserved sub-carriers that take away from the allocated spectrum for normal communication. e.g., METHOD AND SYSTEM FOR ADAPTIVE PEAK TO AVERAGE POWER RATIO REDUCTION IN ORTHOGONAL FREQUENCY DIVISION MULTIPLEXING COMMUNICATION NETWORKS, U.S. Patent Application Publication No. 2009/0092195 A1, Apr. 9, 2009.

When OFDM and time domain technologies are used in the same band (sharing the same transmitter) then the PPR method used may be a time domain method having the above mentioned limitations.

SUMMARY

Methods and systems for achieving peak power reduction in a radio are disclosed. According to one aspect, the invention provides a method for peak power reduction that includes establishing at least one branch corresponding to a carrier for processing. In the at least one branch an input signal having a corresponding carrier is received. A segment filter configured to produce a set of weights corresponding to a characteristic of the input signal is used. The weights change when the characteristic of the signal changes. The segment filter is further configured to produce a transition index which signifies a time at which a change in the weights occurs. Successive signal segments of the input signal are selected. The sequence of selected signal segments corresponds to a set of weights and starts at a time signified by a transition index. A transition index is supplied by a branch of the at least one branch having a transition index that is less than a transition index of any other branch. Each signal segment is processed based on the corresponding weights to produce a clipped signal segment. A window is applied to a transition between adjacent clipped signal segments corresponding to different weights. The window is positioned by the transition index to produce a reduced output signal. The reduced output signal of each branch is combined to produce a combined peak power reduced output signal.

According to this aspect, the processing of each signal segment includes deriving an excess signal from the corresponding signal segment. The excess signal has energy of the signal segment exceeding a threshold. The excess signal is filtered by applying the weights corresponding to the signal segment to produce a filtered excess signal. The filtered excess signal is subtracted from a representation of the signal segment to produce a clipped signal segment corresponding to the signal segment being processed. In some embodiments, the processing of each signal segment includes converting the signal segment to the frequency domain before the deriving step and converting the clipped signal to the time domain after the subtracting step. In some embodiments, the weights are given by $$W_m(k) = \frac{\sigma\left[\left(\sum_{m=1}^{M} N_{inband}\right) + N_{gap}\right]w_m(k)}{\sum_{m=1}^{M}\left(\sum_{k=0}^{K-1} w_m(k)\right)}$$

where $N_{inband}$ are the number of samples within the frequency spectrum of the carrier, $N_{gap}$ is the number of samples of the frequency spectrum gap between carriers, $\sigma$ is a re-growth optimization factor, $w_m(k)$ are input weights from a baseband processor from which the input signal is received and k is the frequency index. In one embodiment, the input signal is a long-term evolution, LTE, signal and the input weights correspond to a desired signal-to-noise ratio of an LTE carrier of the LTE signal. When the input signal is a long-term evolution signal, the weights may change if the symbol of the input signal changes. In some embodiments, multiple branches are provided to simultaneously process multiple input signals. Each input signal has a different carrier. Each carries one of a long-term evolution carrier, a wideband code division multiple access carrier, a code division multiple access carrier, and a GSM carrier. It is contemplated that any number of these different carrier types or other carrier types not mentioned may be used. In some embodiments, the weights converted to the time domain are multiplied by a filter window in the time domain. The filter window is chosen to achieve at least one of a desired frequency domain resolution and desired rejection of spectral emissions. In some embodiments, a start of the window occurs at a time index given by:

$$i_s(q) = i_T - (N_{TW}-1)/2 - (N_f-1)/2 + qN_s,$$

where $I_T$ is the transition index, $N_{TW}$ is the length of the window, $N_f$ is the number of non-zero segment filter weights, $N_s$ is the number of segments corresponding to a current set of weights, and q is a non-negative integer. In this embodiment, the samples of the signal segment are given by:

$$S_m^v(q) = S_m^{in}(i_s(q), i_s(q)+1, \ldots, i_s(q)+K-1),$$

where K is the total number of samples in the selected signal segment. A number of usable samples of the clipped signal segment is $N_{so}$, and, when all usable samples are used, a start of a segment of the useable samples is given by the index:

$$i_s(q) = i_T - (N_{TW}-1)/2 - (N_f-1)/2 + qN_s$$

and the useable samples are given by $$S_m^f(q) = S_m^e(i_{ss}(q), i_{ss}(q)+1, \ldots, i_{ss}(q)+N_{so}-1).$$

According to another aspect, the invention provides a peak power reduction system. The peak power reduction system includes at least one processing branch. Each processing branch is configured to receive an input signal in the time domain and to reduce peak signal power of the input signal. Each input signal corresponds to a different carrier. The at least one processing branch includes a segment filter configured to produce weights corresponding to a characteristic of the input signal. The weights change when the characteristic of the input signal changes. The segment filter is further configured to produce a transition index to signify a time at which a change in weights occurs. A segment selector is configured to select successive segments of samples of the input signal. Each segment is to be separately processed for peak power reduction. A sequence of selected segments corresponds to a set of weights. A start of a sequence occurs at a time signified by a transition index. The transition index is the transition index produced by the segment filters of the at least one branch. An iterative processor is configured to reduce a peak power of a selected segment based on the weights corresponding to the segment to produce a clipped signal segment for each selected segment. A window is configured to smooth a transition between adjacent sequences of clipped signal segments corresponding to adjacent sequences of selected segments. The position of the window is based upon the transition index to produce a reduced output signal. A combiner combines the reduced output signals from each of the at least one branch to produce a combined peak power reduced output signal.

According to this aspect, in some embodiments, the system further comprises a Fourier transformer configured to transform the selected segments to the frequency domain prior to inputting the selected segments to the iterative processor. In some embodiments, the system further comprises an inverse Fourier transformer configured to transform the clipped signal segments to the time domain after the clipped signal segments are output by the iterative processor. In some embodiments, the system further comprises a sub sequence selector configured to select a useable subset of samples from a clipped signal segment, a sample index of samples in the subset being based on the transition index. In some embodiments, the system further comprises a sub sequence selector configured to select a useable subset of samples from a clipped signal segment, a sample index of samples in the subset being based on a width of the window. In some embodiments, the segment filter further comprises a segment filter window that is applied to the weights in the time domain. In some embodiments, the iterative processor further comprises an excess filter configured to apply the weights to an excess signal, the excess signal representing peak power of the signal segment exceeding a threshold. The weights may be applied to the excess signal in the frequency domain. The characteristics of an input signal may be one of a desired signal-to-noise ratio and symbol length.

According to another aspect, the invention provides a peak power method. The method is performed in each of a plurality of processing paths. An input signal corresponding to a carrier is received at a processing path. A set of weights is determined based on a characteristic of the input signal. A transition index is produced that indicates a time at which the characteristic changes. A sequence of signal segments of the input signal is determined. Each sequence starts at a time indicated by a transition index produced by one of the plurality of processing paths. Each sequence is associated with a corresponding set of weights. An iterative process of clipping energy from each signal segment is performed based on the set of weights associated with the signal segment to produce a clipped energy signal segment corresponding to the signal segment. A window is applied at a transition between a first sequence of clipped energy signal segments and a second sequence of clipped energy signal segments. The position of the window is based on the transition index.

According to this aspect, in one embodiment the method further includes computing an excess signal derived from clipping a signal representative of a combination of concurrent signal segments in the plurality of processing paths. The excess signal is provided to each iterative processor in the plurality of processing paths. The excess signal is filtered in each processing path using the set of weights determined by the processing path. In some embodiments, the iterative process includes changing a sample rate of a signal segment before combining concurrent signal segments of the plurality of processing paths for clipping. In some embodiments the first processing path receives an LTE input signal and a second processing path simultaneously receives a CDMA input signal.

DETAILED DESCRIPTION

Figure 1:
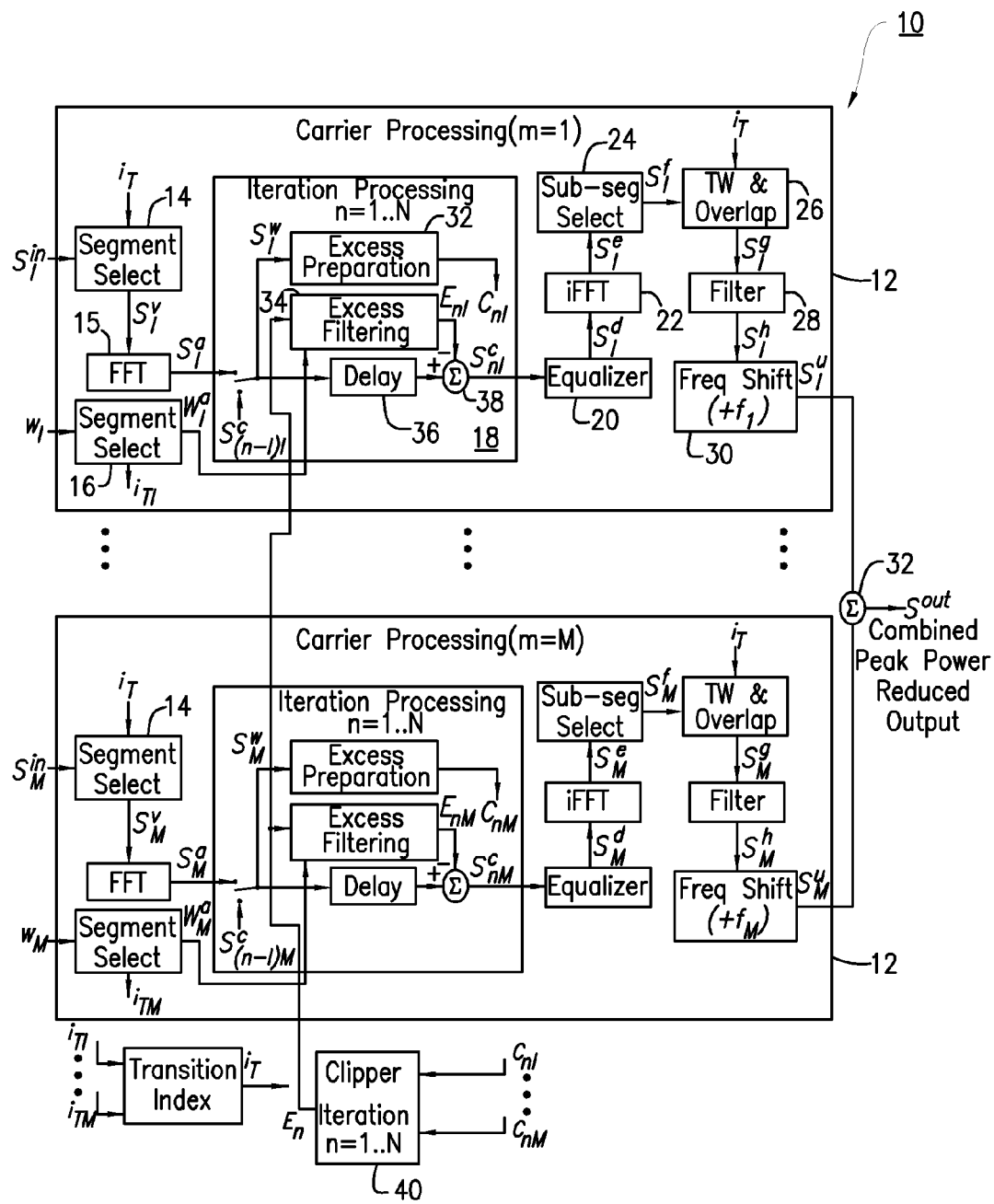
FIG. 1 is a block diagram of a PPR system implemented in accordance with principles of the present invention.

Before describing in detail exemplary embodiments that are in accordance with the present invention, it is noted that the embodiments reside primarily in combinations of apparatus components and processing steps related to peak power reduction in a radio in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, universal PPR is used to perform peak power reduction on time domain signals, such as CDMA, WCDMA and GSM, as well as frequency domain signals, such as OFDM signals used in long-term evolution, LTE, systems, and on combinations of time and frequency domain signals. Processing is performed on a segment of data at a time. The size of the segment of data chosen is based on a desired latency, frequency resolution and peak power reduction performance in a given system.

The processing of each segment is performed in iterations. Each iteration of PPR takes as an input the frequency domain representation of the signal from the previous iteration, determines an excess signal represented in the frequency domain, and subtracts this from the input to produce a further peak power reduced frequency domain signal.

All operations are performed in the excess path so that computational complexity can be minimized, as the quantization noise and other distortions have no effect on the main signal. In addition, if there are no peaks above the configured peak power reduction threshold, then the signal passes through the PPR iterations with no change.

The excess signal is weighted according to the tolerance for distortion (EVM) for each subcarrier or carrier. Some portion of the spectrum in the guard band may be used to improve the PPR performance. Equalization may be performed on the spectrum in the guard band to improve PPR performance and reduce filtering complexity. A normalization step is performed on the excess signal weights to ensure that the targeted peak production is met while minimizing EVM impact.

Interpolation between samples ensures that all peaks are operated on and interpolation back to the original samples is done in the access path and in the frequency domain where it is simpler to implement. No extra fast Fourier transforms (FFT) or inverse Fourier transforms (IFFT) are needed to perform the interpolation. A transition that occurs when the segment filter changes is handled by a transition window.

FIG. 1 is a high level block diagram of a PPR system constructed in accordance with principles of the present invention, and is denoted generally as system 10. There are M input time domain baseband carrier signals, $S_m^{in}(i)$, entering the PPR system 10, where m=1, 2, ... M, is the carrier index, and i is the sample index. Thus, there are M carrier processing blocks 12.

The input baseband carrier signals can be of different technologies, such as LTE, CDMA, WCDMA or GSM. Further, multiple carriers may be frequency shifted and combined and then treated as a single carrier for the purposes of PPR. Additionally, a single carrier may be split into two or more carriers by splitting the frequency domain samples into sub bands, where each sub band is then treated as a carrier, and by reducing K and the sample rate, where K is a length of a segment.

In each carrier processing block 12, there is a segment select block 14. A function of the segment select block 14 is to choose a segment of K samples of the carrier signal. For each segment, the K samples of the segment are transformed to the frequency domain by performing a K point fast Fourier transform, FFT 15. Concurrently, a segment filter 16 produces weights, $W_m^a(k)$, for use by an iteration processing block 18. In the iteration processing block 18, N iterations of PPR processing are performed. After completion of the PPR iterations, the carrier signals are equalized by an equalizer 20 and converted to the time domain by an inverse Fourier transformer 22. Sub segment select block 24 selects the fully convolved portion of the samples of the segment based on normal fast convolution properties. A transition window and overlap block 26 is applied across the boundaries where the segment filter 16 changes. The signal is then optionally filtered by a filter block 28. Each of the carrier signals is mixed to the correct offset frequency by a frequency shifter 30 followed by combining of all the carriers to produce the PPR combined peak power reduced output signal by a combiner 32.

Thus, the first stage of PPR processing of each time domain carrier signal by segment select block 14 includes a selection of a segment of K samples, $S_m^v = S_m^{in}(i_s, i_s+1, \ldots, i_s+K-1)$, where $i_s$ is the starting index of the segment signal. The segment is then converted to a frequency domain signal by performing a K point FFT in block 15.

Figure 2:
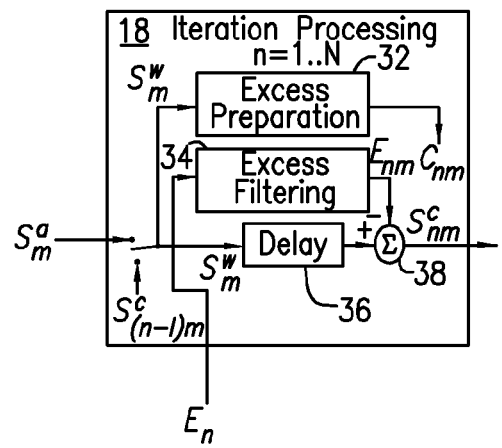
FIG. 2 is a block diagram of an exemplary iteration processing block.

Referring to FIG. 2, the iteration processing block 18 has an excess preparation block 32, an excess filtering block 34, a delay block 36 and a subtraction block 38. The excess preparation block 32 generates an interpolated time domain signal that is frequency shifted to the carrier frequency, $f_m$. The frequency shifted signal, $C_{nm}$, is then input to a clipper block 40. The clipper block 40 outputs an excess signal, $E_n$, that includes the portion of the frequency shifted signal that exceeds a clipping threshold. The excess filter block 34 filters the clipped excess signal using fast convolution. In particular, the segment filter weights from the segment filter block 16 are multiplied within the excess filter block 34 by the excess signal in the frequency domain. The excess filter block 34 then applies a phase slope to interpolate the filtered excess sample time back to the original signal sample time to produce the output, $E_{nm}$. The excess signal, $E_{nm}$, output from the excess filtering block 34 is subtracted in subtraction block 38 from a delayed version of the signal, $S_m^w$, resulting from the previous iteration. The delayed version of the signal resulting from the previous iteration is obtained from the delay block 36. The signal input to the delay block 36 is equal to the output of the FFT block 14 for the first iteration, n=1, and is equal to the output of the previous iteration for subsequent iterations.

Figure 3:
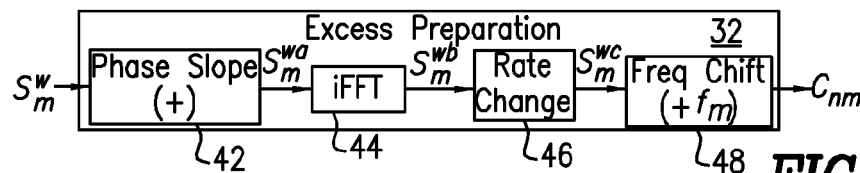
FIG. 3 is a block diagram of an exemplary excess preparation block.

FIG. 3 is a more detailed block diagram of the excess preparation block 32. The excess preparation block 32 is configured to interpolate the input signal, converting the interpolated input signal to the time domain, applying an optional rate conversion, and then shifting the signal to the correct offset frequency. Positive phase slope 42 is applied to the frequency domain components of the input signal. The output of the positive phase slope block 42, $S_m^{wb}$, is converted to the time domain by performing a K point IFFT 44. The output of the IFFT block 44 is optionally input to a rate change block 46. The rate change block 46 has two functions. First, the rate change block 46 changes the rate of each carrier so that the sample rate of all the carriers are the same before the carriers are combined. Second, the sample rate of all carriers can be increased so that the sample rate of the combined carrier signal is increased, with the result that the number of iterations for a specific performance level is reduced. Finally, the signal output from the rate change block 46, $S_m^{wc}$, is frequency shifted to the carrier frequency in the frequency shift block 48 to produce the output excess preparation time domain signal, $C_{nm}$, which is an input to the clipper block 40.

Figure 4:
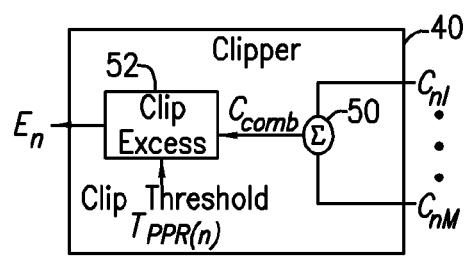
FIG. 4 is a block diagram of an exemplary clipper block.

FIG. 4 is a more detailed block diagram of the clipper block 40. The clipper block is configured to combine the carrier signals and generate the excess signal, $E_n$. The M time domain signals, $C_{nm}$, are received by the clipper block 40 and summed by a summer 50 to produce the combined signal, $C_{comb}$. This combined signal represents the peaks of the time domain signal that will be reduced. An excess signal, $E_n$, is produced by the clip excess block 52. The excess signal represents the portion of the input signal, $C_{tot}$, which exceeds a predetermined peak power threshold. The excess signal may be calculated in the clip excess block 52 by the following equation:

$$E_n = \left[1 - \frac{\sqrt{T_{PPR}(n)}}{|C_{comb}|}\right] C_{comb}$$

the excess signal can be rewritten as:

$$E_n = f(u) C_{comb}$$

where $$f(u) = \begin{cases} 0; & u \le l \\ l - \frac{l}{\sqrt{u}}; & u > l \end{cases}$$

and $$u = \frac{|C_{comb}|^2}{T_{PPR}(n)} = \frac{l}{T_{PPR}(n)} |C_{comb}|^2.$$

The excess signal is passed to the iteration processing blocks 18 of all the carriers where filtering will be applied in the excess filter blocks 34

Figure 5:
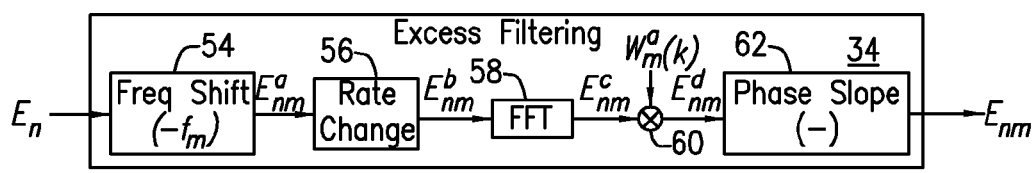
FIG. 5 is a block diagram of an exemplary excess filter block.

FIG. 5 is a more detailed block diagram of the excess filter block 34. The excess filter block 34 performs fast convolution filtering on the excess signal by means of multiplication of the segment filter weights with the excess signal in the frequency domain. In a frequency shift block 54, the time domain excess signal, $E_n$, is mixed with frequency, $-f_m$, back to baseband to produce the signal, $E_{nm}^a$. In the case where an optional rate increase was performed in the excess preparation block 32, the rate must be decreased by the same amount to bring the signal for the carrier back to its original sample rate. This is performed by rate change block 56. The K samples of the signal, $E_{nm}^b$, are input to a K point FFT 58 to convert the excess signal to the frequency domain. The signal is then filtered at multiplier 60 by multiplying the K frequency domain values, $E_{nm}^c(k)$, by the segment filter weight values, $W_m^a(k)$, from the segment filter 16. Fractional delay is added to the weighted signal by applying a phase slope 62 across the frequency components to produce the output signal, $E_{nm}$. After applying the fractional delay, the signal sample points are now lined up with the input signal sample points.

Figure 6:
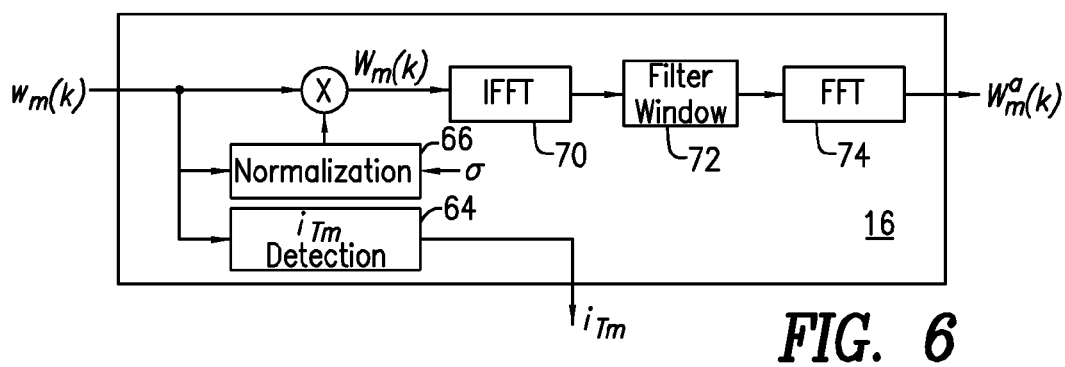
FIG. 6 is a block diagram of an exemplary segment filter.

FIG. 6 is a more detailed block diagram of the segment filter 16. The input to the segment filter 16 are K weights, $w_m(k)$, having a value between 0 and 1. The weights, $w_m(k)$, are based on a characteristic of the signal. When a characteristic of the signal changes, the weights change. Upon detection of a change in the weights, $w_m(k)$, the index, $i_{Tm}$, where the transition occurs will be output. This index is determined by detection block 64. The weight value for each frequency bin controls the relative amount of clipped energy that will fall on that frequency component. The normalized weight values, $W(k)$, are given by:

$$W_m(k) = \frac{\sigma \left[\left(\sum_{m=1}^{M} N_{inband}\right) + N_{gap}\right] w_m(k)}{\sum_{m=1}^{M} \left(\sum_{k=0}^{K-1} w_m(k)\right)}.$$

The variable, $\sigma$, is a re-growth optimization factor which is typically on the order of 0.3-1.0. $N_{gap}$ is the frequency spectrum gap between carriers if the carriers are not next to each other. The normalization using the variable re-growth optimization factor is performed in a normalization block 66, and is multiplied by the weights, $w_m(k)$, in a multiplier 68 to produce the weight values, $W(k)$.

In the case of LTE signals, the weight components, $w_m^{LTE}(k^{LTE})$, will correspond to the desired signal-to-noise ratio SNR of the LTE subcarrier, where $k^{LTE}$ is the LTE subcarrier frequency index. The number of weight components will be equal to the FFT size used for the carrier. For example, a 10 MHz LTE carrier can have a base FFT size of $K^{LTE}$ equal to 1024.

As explained above, the filtering of the excess signal, $E_n$, is performed using a fast convolution where the excess signal in the frequency domain, $E_{nm}^c(k)$, is multiplied by the frequency domain segment filter, $W_m^a(k)$. In order to produce more than one equivalent to linearly convolved output samples at a time, the segment filter is transformed to the time domain by an IFFT 70, padded with zeros. The non-zero parts are windowed by a filter window 72. The number of linearly convolved output samples will be equal to the number of padded zeros plus 1. The filter window 72 has a length, $N_f$. The filter window shape helps determine the effective spectral resolution as well as the ultimate rejection which relates to the spectral emissions level. A lower emissions window will result in lower resolution. The output of the filter window 72 is transformed to the time domain by an FFT 74. The FFT size K determines the amount of data needed before a segment can be processed and therefore affects the latency. The latency, processing performance and desired resolution are used to select the size of K and $N_f$.

A near optimum segment filter window that is easy to compute and has a single parameter $\alpha$ that controls the emissions level is given by:

DPS – Kaiser Window (improved approximation for Discrete Prolate Spheroidal Window)

$$\omega[n] = \left\{\sum_{m=0}^{50} \left[\left(\pi\alpha \left[1 - \left(\frac{2n\varepsilon}{N-1}\right)^2\right]^\delta\right)^{2m} (2^m m!)^{-2}\right]\right\}^\gamma \left\{\sum_{m=0}^{50} [(\pi\alpha)^{2m}(2^m m!)^{-2}]\right\}^{-\gamma}$$

$$\text{or } \omega[n] = I_0\left(\pi\alpha\left[1 - \left(\frac{2n\varepsilon}{N-1}\right)^2\right]^\delta\right)^\gamma I_0(\pi\alpha)^{-\gamma}$$

$$1 \le \alpha \le 10; \alpha \cong \frac{-(\text{side lobe level in } dBc) - 4}{28};$$

$$\text{e.g. } \alpha = \frac{-(60 dBc) - 4}{28} = 2.0$$

$$\gamma = 0.8925$$

$$\delta = 0.50219 + 10^{1.196 \log(\alpha)^3 - 3.188 \log(\alpha)^2 + 1.879 \log(\alpha) - 2.492}$$

$$\varepsilon = \frac{1}{1 + 10^{-0.967 \log(\alpha)^3 + 2.261 \log(\alpha)^2 - 4.298 \log(\alpha) - 0.722}}$$

The size K of the fast convolution filter weights, $w_m(k)$, could be larger or smaller than the base LTE weight size $K^{LTE}$. In the case when $K > K^{LTE}$, the weights $w_m^{LTE}(k^{LTE})$ are up-sampled to size K by, for example, converting $w_m^{LTE}(k^{LTE})$ to the time domain with a $K^{LTE}$ point IFFT, zero padding the weight vector and then performing a K point FFT. In the case when $K > K^{LTE}$, the weights $w_m^{LTE}(k^{LTE})$ are down-sampled.

Note that some of the spectrum outside the pass band can be allocated for PPR clipped energy distribution while still meeting the emission requirements. In this case, the weight value will typically be $w_m(k)=1$. This guard band spectrum does not take any spectrum away from the carrier and therefore does not result in any impact to the capacity of the carrier.

The transition index detection block 64 outputs the next transition index, $i_T$, based on the earliest of the collection of indices, $i_{Tm}$ which are then distributed to the segment select blocks 14 and the transition window and overlap blocks 26.

Figure 7:
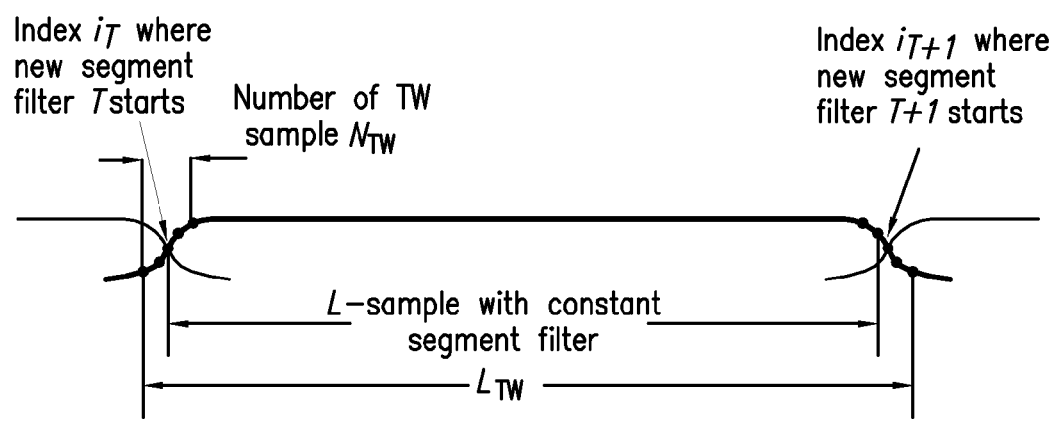
FIG. 7 is a diagram of a transition window applied at boundaries of segments.

Returning to the segment select block 14, the input data is processed in overlapping segments of K samples per segment. In the general case, the segment filter changes in time and $N_s$ is the number of segments that use the same segment filter. Although these segments have the same segment filter, processing is still done a segment at a time in order to minimize latency. Consider, for example, the case where the segment filter changes every L samples, starting at sample index $i_T$, with T being the segment filter identifier. A transition window with length $N_{TW}$ will be applied across the change boundaries of the segment filter, with the center value of the boundary transition window at the index where the segment filter changes. This is shown in FIG. 7. A reason to apply the transition window is to reduce the out of band emissions that would otherwise result from the change in the segment filter.

The number of segments $N_s$ using the same segment filter is given by:

$$N_s = \lceil L_{TW}/N_{so} \rceil$$

where $\lceil \ \rceil$ is the ceiling function, and where $$L_{TW} = L + N_{TW},$$

$$N_{so} = K - N_f + 1$$

$N_{TW}$ is the length of the transition window, $N_f$ is the number of nonzero segment filter taps and $N_{so}$ is the number of usable output samples generated for each segment. In the case where all of the usable output samples are selected, the starting index $i_s(q)$ for the first segment where new segment filter applies (q=0) and for subsequent segments (q=1, 2, ...) is:

$$i_s(q) = i_T - (N_{TW}-1)/2 - (N_f-1)/2 + qN_s$$

The segment select block therefore selects the samples:

$$S_m^v(q) = S_m^{in}(i_s(q), i_s(q)+1, \ldots, i_s(q)+K-1).$$

Returning to the sub-segment select block 24, the number of usable output samples generated for each segment is $N_{so}$. In the case where all of the usable output samples are selected, then the start index of the samples for each sub-segment is:

$$i_{ss}(q) = i_s(q) + (N_f-1)/2$$

The sub-segment select block 24, therefore selects the samples:

$$S_m^f(q) = S_m^e(i_{ss}(q), i_{ss}(q)+1, \ldots, i_{ss}(q)+N_{so}-1)$$

If the number of samples $L_{TW}$ is not an exact multiple of $N_{so}$ then the starting location and/or number of output samples used for each segment may be adjusted.

Returning to the transition window and overlap block 26, a transition window will be applied across the boundaries where the segment filter changes, as shown in FIG. 7. The transition window function at the beginning can be a raised cosine window defined as follows:

$$F_{TW}(i) = 0.5 - 0.5 \cos(\pi i/(N_{TW}+1))$$

for i=1, 2, ..., $N_{TW}$ and where sample i=$(N_{TW}-1)/2+1$ aligns with segment filter change sample $i_p$, defined above. The transition window function at the end should be $1-F_{TW}(i)$. The transition window data at the beginning where a new segment filter starts is overlapped and added to the transition window data at the end where the previous segment filter stops.

Figure 8:
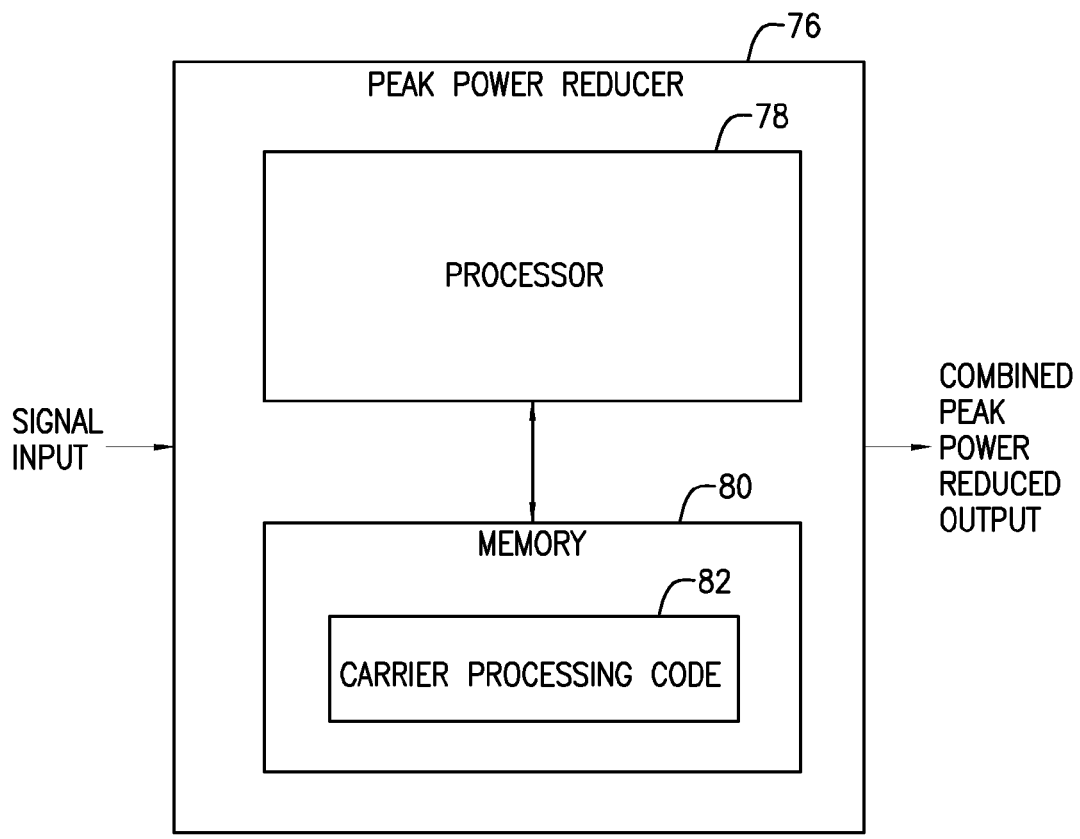
FIG. 8 is a block diagram of an exemplary peak power reducer.

FIG. 8 is a block diagram of a peak power reducer 76 implemented by way of one or more processors 78 executing carrier processing code 82 stored in a memory 80. Alternatively, the peak power reducer 76 can be implemented by one or more application-specific integrated circuits or digital signal processors.

Figure 9:
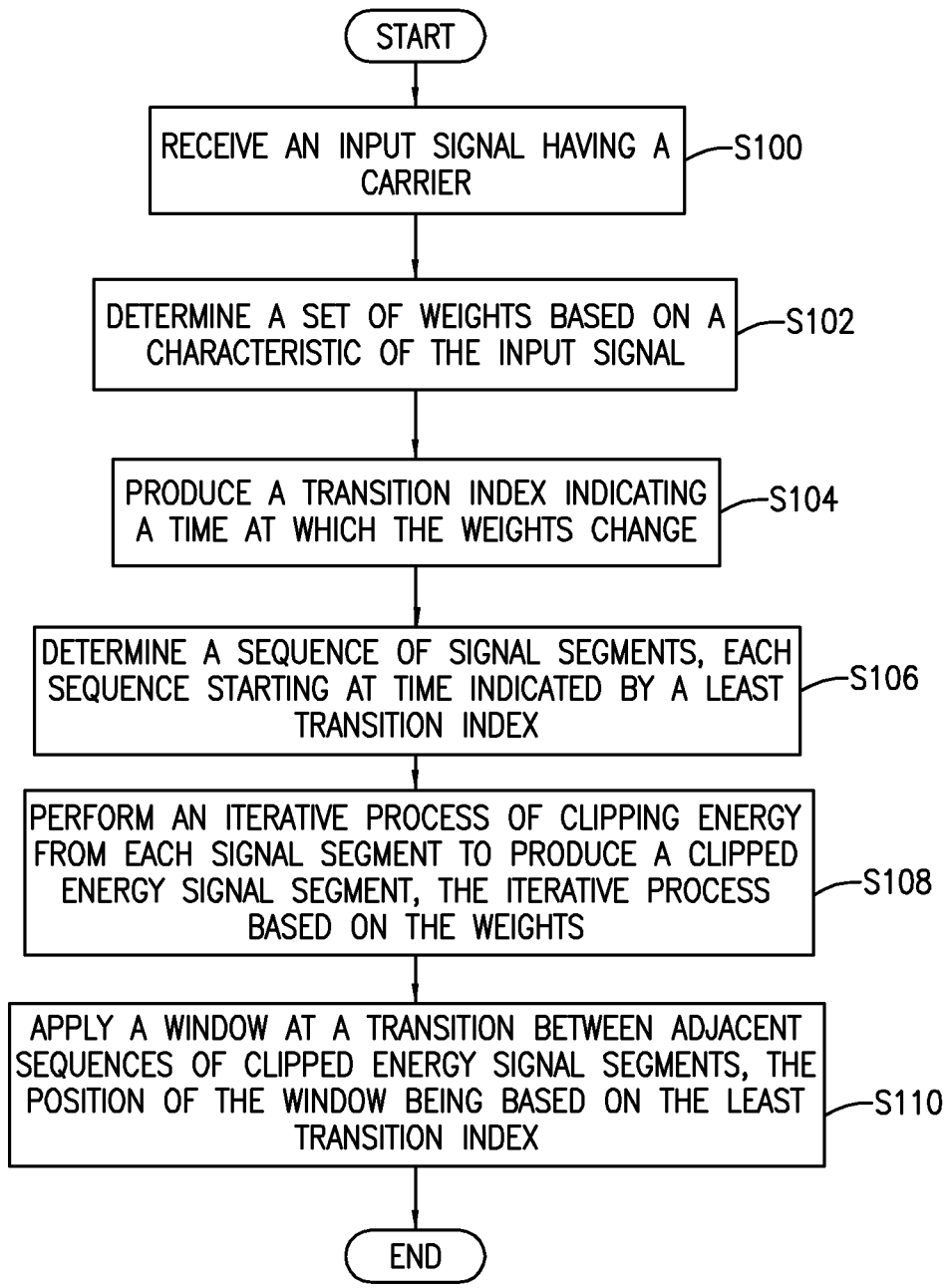
FIG. 9 is a flowchart of an exemplary process for peak power reduction.

FIG. 9 is a flowchart of an exemplary process for peak power reduction. An input signal having a carrier is received (block S100). A set of weights are determined, for example, by the segment filter 16, based on a characteristic of the input signal (block S102). The transition index indicates a time at which the weights changed is produced (block S104). The sequence of signal segments is determined, for example, by the segment select block 14. Each sequence starts at the time indicated by a transition index (block S106). An iterative process, performed for example by the iterative processing block 18, of clipping energy from each signal segment is performed to produce a clipped energy signal segment. The iterative process is based on the weights (block S108). A window, such as applied by the transition window and overlap block, 26 is applied to the transition between adjacent sequences of clipped energy signal segments. The position of the window is based on the transition index (block S110).

The universal peak power reduction systems methods described herein handle multicarrier time domain and frequency domain signals in parallel. This allows for lower cost and lower complexity of signal processing at least because the signal is represented by a smaller number of samples and at least because all signal processing is done in the excess path while in parallel handling time domain and frequency domain signals. The techniques described herein allow better flexibility, for example, to target higher output power, while meeting PAPR and emissions levels when EVM requirements are less stringent. Further, the system described herein can adapt to EVM requirement variations across the subcarriers of a carrier and across multiple carriers while at the same time handling time domain signals and their corresponding EVM requirements. Also, spectrum in the guard band can be used to improve PPR performance for both frequency domain and time domain carriers. Universal PPR segment processing and fast convolution segment filtering make it easy to configure a system to optimize the trade-offs between delay, filtering performance and PPR performance.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A method of peak power reduction in a radio, the method comprising:
   in each of at least one branch, each branch corresponding to a different carrier:
      receiving an input signal having a corresponding carrier;
      using a segment filter configured to produce a set of weights corresponding to a characteristic of the input signal, the weights changing when the characteristic of the signal changes, the segment filter further configured to produce a transition index which signifies a time at which a change in the weights occurs;
      selecting successive signal segments of the input signal, a sequence of selected signal segments corresponding to a set of weights and starting at a time signified by a least transition index, the transition index being supplied by a branch of the at least one branch having a transition index that is less than a transition index of any other branch;
      processing each signal segment based on the corresponding weights to produce a clipped signal segment; and
      applying a window to a transition between adjacent clipped signal segments corresponding to different weights, the window positioned by the transition index to produce a reduced output signal; and
   combining the reduced output signal of each branch to produce a combined peak power reduced output signal.

2. The method of claim 1, wherein the processing of each signal segment includes:
   deriving an excess signal from the corresponding signal segment, the excess signal having energy of the signal segment exceeding a threshold;
   filtering the excess signal by applying the weights corresponding to the signal segment to produce a filtered excess signal; and
   subtracting the filtered excess signal from a representation of the signal segment to produce a clipped signal segment corresponding to the signal segment being processed.

3. The method of claim 2, wherein the processing of each signal segment includes converting the signal segment to the frequency domain before the deriving step and converting the clipped signal to the time domain after the subtracting step.

4. The method of claim 1, wherein the weights are given by:

$$W_m(k) = \frac{\sigma\left[\left(\sum_{m=1}^{M} N_{inband}\right) + N_{gap}\right] w_m(k)}{\sum_{m=1}^{M}\left(\sum_{k=0}^{K-1} w_m(k)\right)}$$

where $N_{inband}$ are the number of samples within the frequency spectrum of the carrier, $N_{gap}$ is the number of samples of the frequency spectrum gap between carriers, $\sigma$ is a re-growth optimization factor, and $w_m(k)$ are input weights from a baseband processor from which the input signal is received.

5. The method of claim 4, wherein the input signal is a long term evolution, LTE, signal, and the input weights correspond to a desired signal-to-noise ratio of an LTE carrier of the LTE signal.

6. The method of claim 4, wherein the input signal is a long term evolution, LTE, signal and the weights change if a symbol of the input signal changes.

7. The method of claim 1, wherein multiple branches are provided to simultaneously process multiple input signals, each signal having a carrier, each carrier being one of a long term evolution, LTE, carrier, a wide band code division multiple access, WCDMA, carrier, a CDMA carrier, and a GSM carrier.

8. The method of claim 1, wherein the weights are multiplied by a filter window in the time domain, the filter window chosen to achieve at least one of a desired resolution and a desired rejection of spectral emissions.

9. The method of claim 1, wherein a start of the window occurs at a time index given by:

$$i_s(q) = i_T - (N_{TW}-1)/2 - (N_f-1)/2 + qN_s$$

where $I_T$, is the transition index, $N_{TW}$ is the length of the window, $N_f$ is the number of non-zero segment filter weights, $N_s$ is the number of segments corresponding to a current set of weights, and q is a non-negative integer.

10. The method of claim 9, wherein samples of a selected signal segment are given by:

$$S_m^v(q) = S_m^{in}(i_s(q), i_s(q)+1, \ldots, i_s(q)+K-1)$$

where K is the total number of samples in the selected signal segment.

11. The method of claim 9, wherein a number of useable samples of the clipped signal segment is $N_{so}$, and, when all usable samples are used, a start of a segment of the useable samples is given by the index:

$$i_{ss}(q) = i_s(q) + (N_f-1)/2$$

and the useable samples are given by $$S_m^f(q) = S_m^e(i_{ss}(q), i_{ss}(q)+1, \ldots, i_{ss}(q)+N_{so}-1).$$

12. A peak power reduction system, comprising:
   at least one processing branch, each processing branch configured to receive an input signal in the time domain and to reduce peak signal power of the input signal, each input signal corresponding to a different carrier, the at least one processing branch including:
      a segment filter configured to produce weights corresponding to a characteristic of the input signal, the weights changing when the characteristic of the input signal changes, the segment filter further configured to produce a transition index to signify a time at which a change in weights occurs;

a segment selector configured to select successive segments of samples of the input signal, each segment to be separately processed for peak power reduction, a sequence of selected segments corresponding to a set of weights, a start of a sequence occurring at a time signified by a transition index, the transition index being the transition index produced by the segment filters of the at least one branch;

an iterative processor configured to reduce a peak power of a selected segment based on the weights corresponding to the segment to produce a clipped signal segment for each selected segment; and a window configured to smooth a transition between adjacent sequences of clipped signal segments corresponding to adjacent sequences of selected segments, the position of the window being based upon the transition index to produce a reduced output signal; and a combiner configured to combine the reduced output signals from each of the at least one branch to produce a combined peak power reduced output signal.

13. The system of claim 12, further comprising a Fourier transformer configured to transform the selected segments to the frequency domain prior to inputting the selected segments to the iterative processor.

14. The system of claim 12, further comprising an inverse Fourier transformer configured to transform the clipped signal segments to the time domain after the clipped signal segments are output by the iterative processor.

15. The system of claim 12, further comprising a sub sequence selector configured to select a useable subset of samples from a clipped signal segment, a sample index of samples in the subset being based on the transition index.

16. The system of claim 12, further comprising a sub sequence selector configured to select a useable subset of samples from a clipped signal segment, a sample index of samples in the subset being based on a width of the window.

17. The system of claim 12, wherein the segment filter further comprises a segment filter window that is applied to the weights in the time domain.

18. The system of claim 12, wherein the iterative processor further comprises an excess filter configured to apply the weights to an excess signal, the excess signal representing peak power of the signal segment exceeding a threshold.

19. The system of claim 18, wherein the weights are applied to the excess signal in the frequency domain.

20. The system of claim 12, wherein the characteristic of an input signal is one of a desired signal to noise ratio and a symbol length.

21. A peak power reduction method, comprising:
in each of a plurality of processing paths:
receiving an input signal corresponding to a carrier;
determining a set of weights based on a characteristic of the input signal;
producing a transition index indicating a time at which the characteristic changes;
determining a sequence of signal segments of the input signal, each sequence starting at a time indicated by a transition index produced by one of the plurality of processing paths, each sequence being associated with a corresponding set of weights; and
performing an iterative process of clipping energy from each signal segment based on the set of weights associated with the signal segment to produce a clipped energy signal segment corresponding to the signal segment; and
applying a window at a transition between a first sequence of clipped energy signal segments and a second sequence of clipped energy signal segments, the position of the window being based on the transition index.

22. The method of claim 21, further comprising:
computing an excess signal derived from clipping a signal representative of a combination of concurrent signal segments in the plurality of processing paths;
providing the excess signal to each iterative processor in the plurality of processing paths; and
filtering the excess signal in each processing path using the set of weights determined by the processing path.

23. The method of claim 21, wherein the iterative process includes changing a sample rate of a signal segment before combining concurrent signal segments of the plurality of processing paths for clipping.

24. The method of claim 21, wherein a first processing path receives a long term evolution, LTE, input signal and a second processing path simultaneously receives a code division multiple access, CDMA, input signal.

* * * * *